(12) United States Patent
Kim et al.

(10) Patent No.: US 12,476,489 B2
(45) Date of Patent: Nov. 18, 2025

(54) ELECTRONIC DEVICE INCLUDING COIL FOR WIRELESS POWER TRANSMISSION

(71) Applicant: Samsung Electronics Co., Ltd., Suwon-si (KR)

(72) Inventors: Yongjae Kim, Suwon-si (KR); Jaedeok Cha, Suwon-si (KR); Seoncheol Kim, Suwon-si (KR); Byongjeon Lee, Suwon-si (KR); Jungje Bae, Suwon-si (KR); Jaesub Youn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 17/733,607

(22) Filed: Apr. 29, 2022

(65) Prior Publication Data
US 2022/0255353 A1 Aug. 11, 2022

Related U.S. Application Data

(63) Continuation of application No. PCT/KR2020/015116, filed on Nov. 2, 2020.

(30) Foreign Application Priority Data

Nov. 1, 2019 (KR) .................. 10-2019-0138952

(51) Int. Cl.
*H02J 50/10* (2016.01)
*H01Q 1/38* (2006.01)
(Continued)

(52) U.S. Cl.
CPC .............. *H02J 50/10* (2016.02); *H01Q 1/38* (2013.01); *H02J 50/005* (2020.01); *H02J 50/80* (2016.02); *H04B 5/79* (2024.01); *H02J 50/90* (2016.02)

(58) Field of Classification Search
CPC ........................................ H02J 50/10
(Continued)

(56) References Cited

U.S. PATENT DOCUMENTS 8,169,185 B2 * 5/2012 Partovi .................. H01F 27/366
320/108
9,904,430 B2 * 2/2018 Shibata .................. G06F 1/1698
(Continued)

FOREIGN PATENT DOCUMENTS

JP        6519711 B1     5/2019
KR     10-1491378 B1     2/2015
(Continued)

OTHER PUBLICATIONS

Korean Notice of Allowability dated Sep. 3, 2024, issued in Korean Patent Application No. 10-2019-0138952.

*Primary Examiner* — Jerry D Robbins
(74) *Attorney, Agent, or Firm* — Jefferson IP Law, LLP

(57) ABSTRACT

An electronic device is provided. The electronic device includes a substrate comprising a touch sensing circuit, which includes a first layer, a second layer overlapping with the first layer, a plurality of first electrode lines arranged on the first layer in a first direction, and a plurality of second electrode lines arranged on the second layer in a second direction that is vertical with respect to the first direction, a coil arranged to at least partially overlap with the substrate, a power transmission circuit for wirelessly transmitting power through the coil, a ground electrically connected to the power transmission circuit, and a control circuit electrically connected to the coil and the ground, wherein the control circuit can be configured to selectively connect the coil to the power transmission circuit or the ground.

15 Claims, 9 Drawing Sheets

(51) Int. Cl.
*H02J 50/00* (2016.01)
*H02J 50/80* (2016.01)
*H04B 5/79* (2024.01)
*H02J 50/90* (2016.01)

(58) Field of Classification Search
USPC .................................................. 320/108
See application file for complete search history.

(56) References Cited

U.S. PATENT DOCUMENTS

| | | | |
|---|---|---|---|
| 10,007,312 B2 * | 6/2018 | Wodrich | H02J 50/10 |
| 10,263,451 B2 | 4/2019 | Konanur et al. | |
| 10,854,375 B2 | 12/2020 | Song et al. | |
| 11,240,365 B1 * | 2/2022 | Hulbert | H04M 1/72448 |
| 2012/0327004 A1 | 12/2012 | Mikladal et al. | |
| 2014/0327624 A1 * | 11/2014 | Srinivas | G06F 1/1656 |
| | | | 345/173 |
| 2015/0116217 A1 | 4/2015 | Choi et al. | |
| 2015/0177896 A1 | 6/2015 | Chun et al. | |
| 2016/0087482 A1 | 3/2016 | Wang | |
| 2016/0181857 A1 * | 6/2016 | Konanur | H04B 5/266 |
| | | | 320/108 |
| 2017/0047647 A1 * | 2/2017 | Jung | H01Q 1/48 |
| 2017/0288298 A1 | 10/2017 | Kim | |
| 2018/0294553 A1 * | 10/2018 | Lim | H01Q 5/35 |
| 2020/0044476 A1 * | 2/2020 | Hsieh | H02J 50/80 |
| 2020/0241701 A1 * | 7/2020 | Nakayama | G06F 3/0445 |
| 2020/0343314 A1 * | 10/2020 | Nakamura | H10K 59/8792 |
| 2020/0411990 A1 * | 12/2020 | Nakamura | H01Q 21/06 |
| 2022/0224157 A1 * | 7/2022 | Hsieh | H02J 50/10 |

FOREIGN PATENT DOCUMENTS

| | | |
|---|---|---|
| KR | 10-2015-0047309 A | 5/2015 |
| KR | 10-2016-0018724 A | 2/2016 |
| KR | 10-2016-0126743 A | 11/2016 |
| KR | 10-2017-0019818 A | 2/2017 |
| KR | 10-2017-0037262 A | 4/2017 |
| KR | 10-1813811 B1 | 12/2017 |
| KR | 10-2018-0058420 A | 6/2018 |
| KR | 10-2018-0108174 A | 10/2018 |
| WO | 2019/138565 A1 | 7/2019 |

\* cited by examiner

ELECTRONIC DEVICE INCLUDING COIL FOR WIRELESS POWER TRANSMISSION

CROSS-REFERENCE TO RELATED APPLICATION(S)

This application is a continuation application, claiming priority under § 365 (c), of an International application No. PCT/KR2020/015116, filed on Nov. 2, 2020, which is based on and claims the benefit of a Korean patent application number 10-2019-0138952, filed on Nov. 1, 2019, in the Korean Intellectual Property Office, the disclosure of which is incorporated by reference herein in its entirety.

BACKGROUND

1. Field

The disclosure relates to an electronic device including a coil for wireless power transmission. More particularly, the disclosure relates to an electronic device including a coil for wireless power transmission, which can be disposed to overcome a limitation on a space of the electronic device.

2. Description of Related Art

Wireless charging technology that can easily charge an electronic device without wires is becoming popular.

The above information is presented as background information only to assist with an understanding of the disclosure. No determination has been made, and no assertion is made, as to whether any of the above might be applicable as prior art with regard to the disclosure.

SUMMARY

An electronic device may be implemented by adding a pad for supporting wireless charging, and may be charged by placing an external electronic device on the pad. The trend of electronic devices is to realize specified performance while strengthening a design aspect and also pursuing a slimming form factor. Thus, considering the interrelationship between components, it may be difficult to arrange the pad in a limited space of the electronic device.

Aspects of the disclosure are to address at least the above-mentioned problems and/or disadvantages and to provide at least the advantages described below. Accordingly, an aspect of the disclosure is to provide an electronic device including a coil for wireless power transmission, which can be disposed to overcome a limitation on a space of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a substrate including a first layer and a second layer overlapping with the first layer, and a touch sensing circuit including a plurality of first electrode lines arranged on the first layer in a first direction, and a plurality of second electrode lines arranged on the second layer in a second direction perpendicular to the first direction, a coil disposed to overlap at least in part with the substrate, a power transmission circuit for wirelessly transmitting power through the coil, a ground electrically connected to the power transmission circuit, and a control circuit electrically connected to the coil and the ground, wherein the control circuit may be configured to selectively connect the coil to the power transmission circuit or the ground.

According to an embodiment of the disclosure, the coil for wireless charging is disposed on or near the rear surface of the substrate including the touch sensing circuit, so that when an external electronic device is placed on the touch input surface, power can be wirelessly transmitted to the external electronic device. This may provide a user experience regarding wireless charging. In addition, when the coil is not in the power transmission mode, the performance of the touch sensing circuit may be ensured by electrically connecting the coil to the ground of the electronic device.

In addition, effects obtainable or predictable from various embodiments of the disclosure will be explicitly or implicitly provided in the detailed description of the embodiments of the disclosure. For example, various effects predicted according to various embodiments of the disclosure will be described in the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
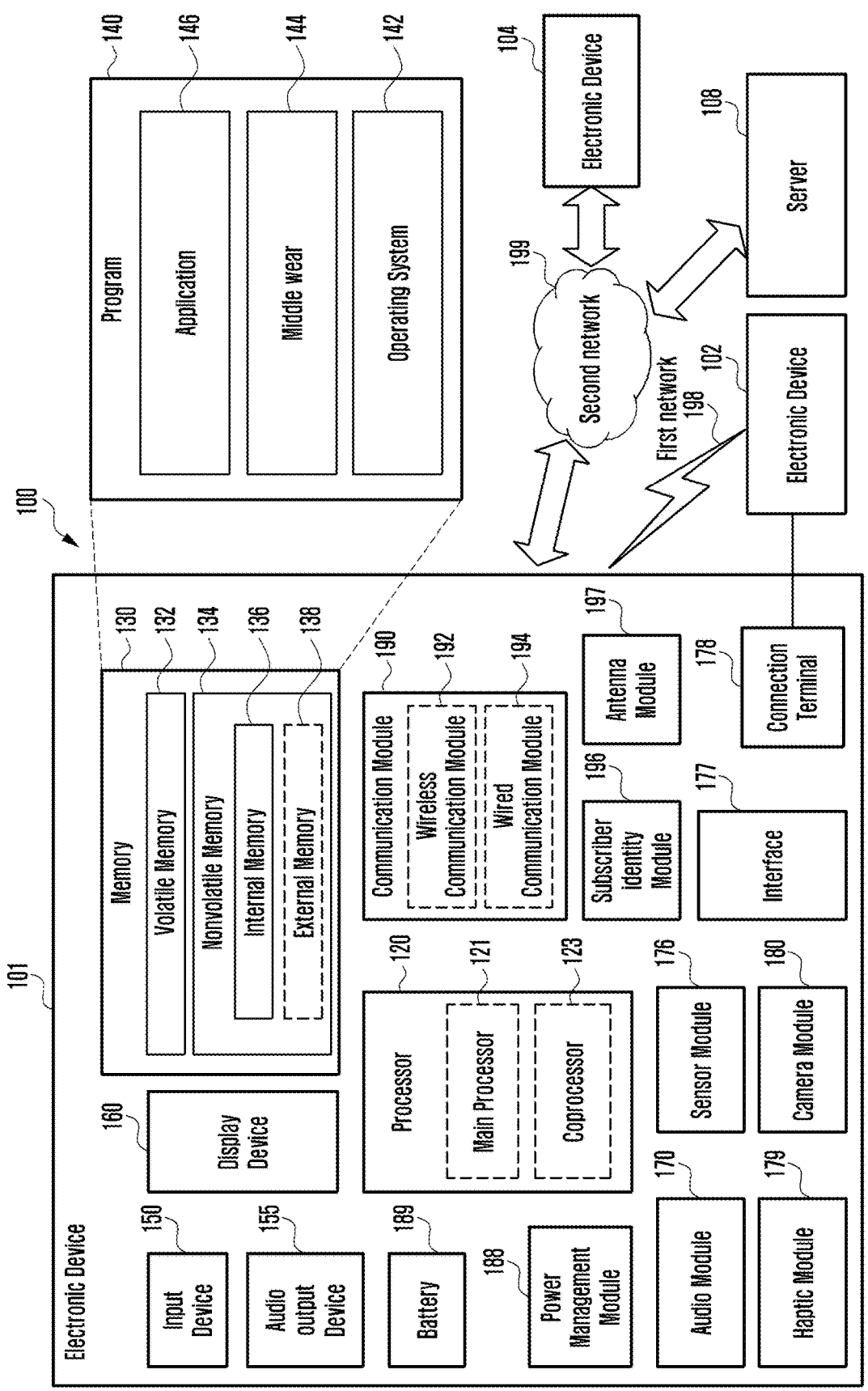
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 includes a processor 120, a memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a mic, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the audio output device 155 or an external electronic device (e.g., an external electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment of the disclosure, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 388 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment of the disclosure, the antenna module may include an antenna including a radiating element including a conductive material or a conductive pattern formed on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 99, may be selected, for example, by the communication module 190 from the plurality of antennas. The signal or the power may then be transmitted or received between the communication module 190 and the external electronic device via the selected at least one antenna. According to some embodiments of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment of the disclosure may be one of various types of electronic devices. The electronic device may include, for example, a portable communication device (e.g., a smart phone), a computer device, a portable multimedia device, a portable medical device, a camera, a wearable device, or a home appliance. However, the electronic device is not limited to any of those described above.

Various embodiments of the document and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" used in the document may include a unit implemented in hardware, software, or firmware, and may interchangeably be used with other terms, for example, "logic", "logic block", "part", or "circuitry", etc. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the document may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
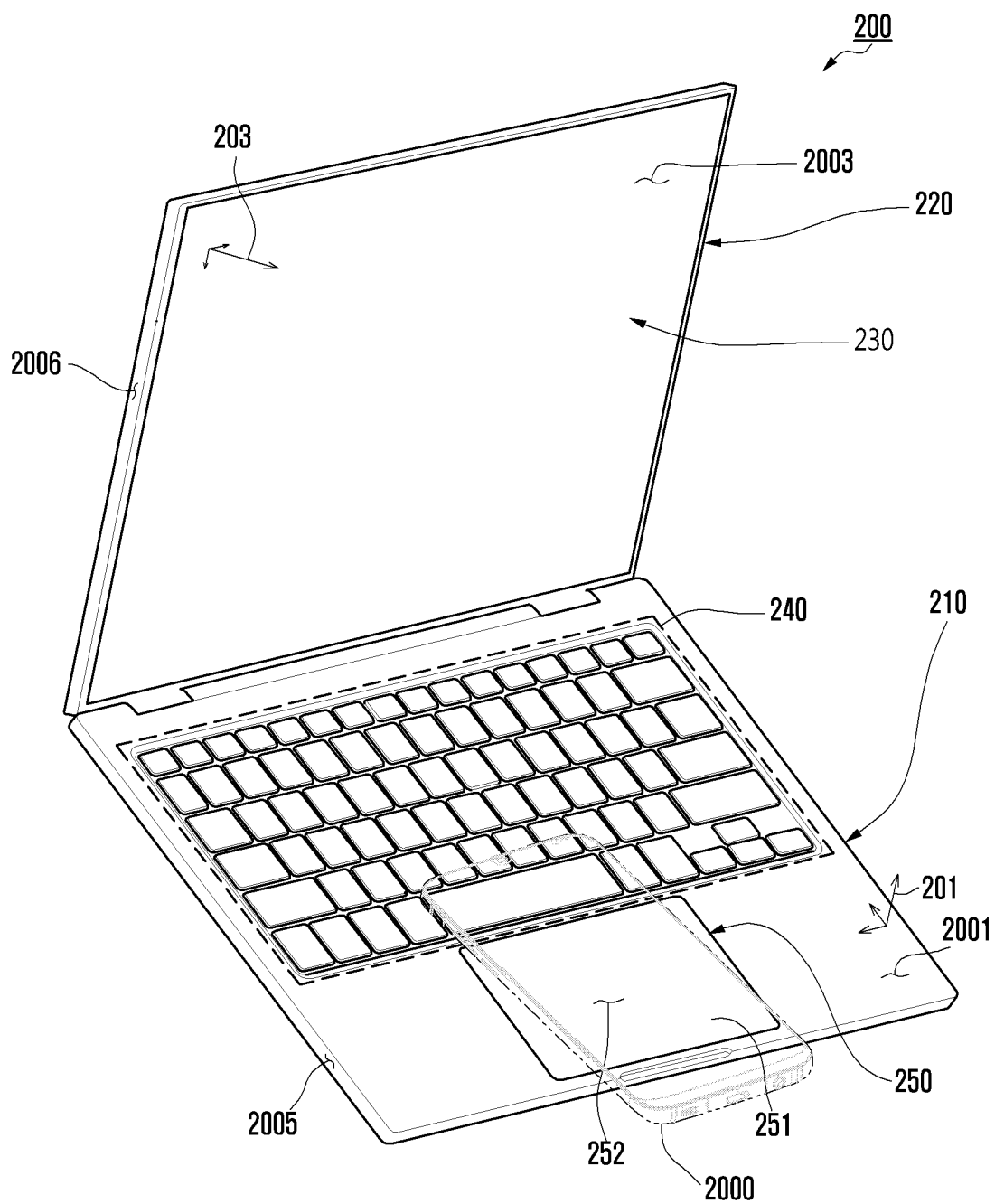
FIG. 2A illustrates an unfolded state of an electronic device according to an embodiment of the disclosure.
Figure 2B:
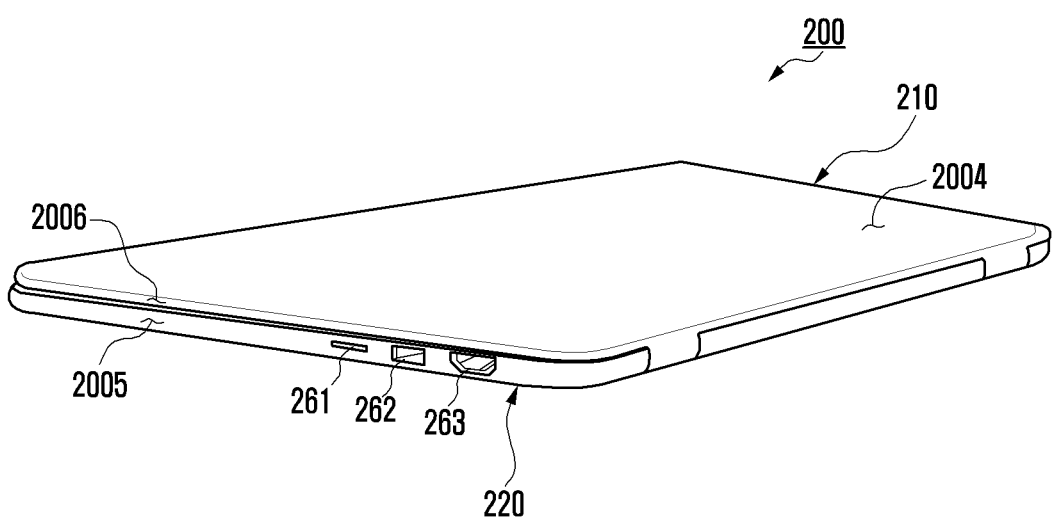
FIG. 2B illustrates a folded state of an electronic device according to an embodiment of the disclosure.

FIG. 2A illustrates an unfolded state of an electronic device according to an embodiment of the disclosure. FIG. 2B illustrates a folded state of an electronic device 200 according to an embodiment of the disclosure.

Referring to FIGS. 2A and 2B, in an embodiment of the disclosure, the electronic device 200 may include a first housing structure 210, a second housing structure 220, a display 230, a keyboard 240, a touch pad 250, and/or connector holes 261, 262, and 263. The electronic device 200 may be, for example, a laptop computer (or a notebook computer). The electronic device 200 may be other various types of foldable devices. According to various embodiments of the disclosure, the electronic device 200 may include the electronic device 101 shown in FIG. 1.

According to an embodiment of the disclosure, the first housing structure 210 may be rotatably connected to the second housing structure 220 by a hinge structure (not shown). According to some embodiments of the disclosure, a housing that includes the first housing structure 210, the second housing structure 220, and the hinge structure may be referred to as a foldable housing.

According to an embodiment of the disclosure, the first housing structure 210 may have a first surface 2001 facing in a first direction 201, a second surface (not shown) facing in a second direction 202 opposite to the first direction 201, and a first side surface 2005 surrounding at least in part a space between the first surface 2001 and the second surface.

According to an embodiment of the disclosure, the second housing structure 220 may have a third surface 2003 facing a third direction 203, a fourth surface 2004 facing a fourth direction opposite to the third direction 203, and a second side surface 2006 surrounding at least in part a space between the third surface 2003 and the fourth surface 2004.

According to an embodiment of the disclosure, in the folded state of the electronic device 200 (see FIG. 2B), the first surface 2001 of the first housing structure 210 and the third surface 2003 of the second housing structure 220 may face each other. For example, in the folded state of the electronic device 200, the first surface 2001 and the third surface 2003 may form a first angle (e.g., an angle between about 0 degrees and about 10 degrees). According to various embodiments (not shown), the electronic device 200 may be implemented such that the second surface and the fourth surface 2004 face each other and are folded. In the unfolded state of the electronic device 200 (see FIG. 2A), the first surface 2001 of the first housing structure 210 and the third surface 2003 of the second housing structure 220 form a second angle greater than the first angle. The electronic device 200 may be in the unfolded state at various second angles.

According to an embodiment of the disclosure, in the folded state of the electronic device 200 (see FIG. 2B), the first side surface 2005 of the first housing structure 210 may be aligned with the second side surface 2006 of the second housing structure 220. In the folded state, a side surface of the electronic device 200 may be formed by the first side surface 2005 and the second side surface 2006 aligned with each other.

In various embodiments of the disclosure, the first housing structure 210 may refer to a structure that forms the first surface 2001, the second surface, or at least a portion of the first side surface 2005.

Figure 3:
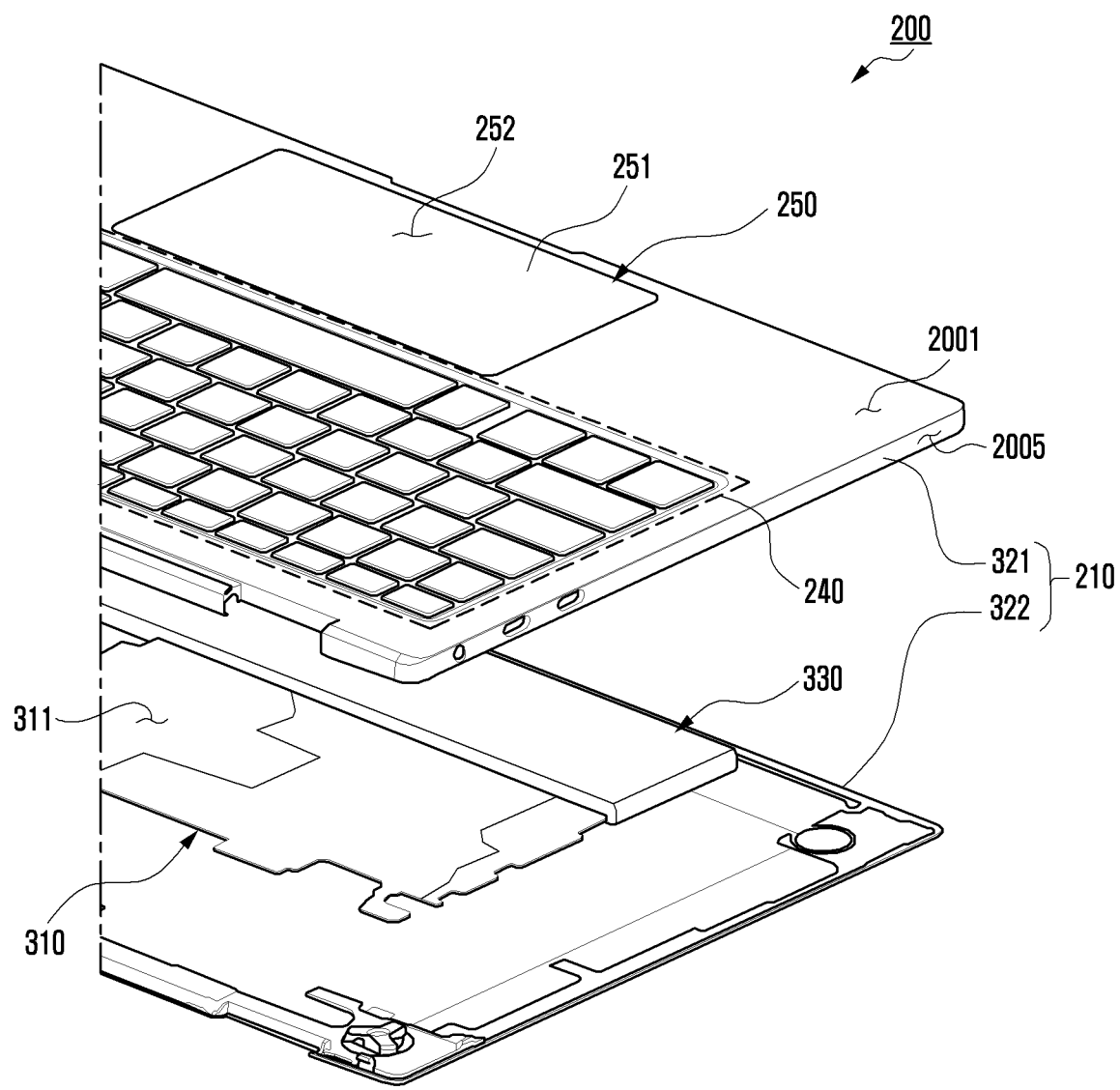
FIG. 3 is an exploded perspective view of a part of an electronic device shown in FIG. 2A according to an embodiment of the disclosure.

FIG. 3 is an exploded perspective view of a part of an electronic device shown in FIG. 2A according to an embodiment of the disclosure.

Referring to FIG. 3, in an embodiment of the disclosure, the first housing structure 210 may include a case 321 forming the first surface 2001 and the first side surface 2005, and a cover 322 forming at least a portion of the second surface.

With reference to FIGS. 2A and 2B, in various embodiments (not shown) of the disclosure, the second housing structure 220 may refer to a structure forming the third surface 2003, the fourth surface 2004, or at least a portion of the second side surface 2006.

According to various embodiments of the disclosure, at least a portion of the first housing structure 210 or the second housing structure 220 may be formed of coated or colored glass, ceramic, polymer, metal (e.g., aluminum, stainless steel (STS), or magnesium), or a combination of at least two of the above materials.

The display 230 may be disposed inside the second housing structure 220, for example. The display 230 may be disposed at least in part along the third surface 2003 and viewed at least in part through the third surface 2003. According to an embodiment of the disclosure, when viewed from above the third surface 2003, the second housing structure 220 may include an edge portion (or a border portion) (e.g., a bezel) (not shown) surrounding the display 230. For example, when viewed from above the third surface 2003, the width of the edge portion may be about 10 mm or less. For example, when viewed from above the third surface 2003, the proportion of the display 230 in the third surface 2003 may be about 90% or more (e.g., a bezel-less display or a full screen display). According to various embodiments of the disclosure, the display 230 may be coupled to or disposed adjacent to a touch sensing circuit, a pressure sensor capable of measuring the intensity (pressure) of a touch, and/or a digitizer detecting a stylus pen of magnetic field type.

The keyboard 240 may be disposed, for example, in the first housing structure 210. According to an embodiment of the disclosure, the first housing structure 210 may have a plurality of through-holes (not shown) formed in the first surface 2001, and a plurality of buttons of the keyboard 240 may be disposed in the plurality of through-holes.

The touch pad 250 is, for example, a pointing device exposed to the first surface 2001 and may include a touch sensing circuit embedded in a touch input surface 252 or disposed on a substrate (not shown) disposed along the touch input surface 252. According to an embodiment (not shown) of the disclosure, when viewed from above the first surface 2001, the touch pad 250 may include a cover 251 that overlaps at least in part with the substrate including the touch sensing circuit and is exposed to the first surface 2001. The cover 251 may be substantially opaque, for example. The touch input surface 252 of the cover 251 exposed to the outside is a portion for receiving or sensing a touch by a user input and may be hereinafter referred to as a 'touch input surface'. For example, when a finger contacts the touch input surface 252 or reaches within a threshold distance from the touch input surface 252, a signal regarding the coordinates may be generated.

According to various embodiments of the disclosure, there may be a click button (not shown) on the rear surface of the touch pad 250, and when the click button is pressed, an input, such as clicking a mouse button may be generated.

According to various embodiments (not shown) of the disclosure, the electronic device 200 may include at least one key input device disposed on the first side surface 2005 of the first housing structure 210, a second side surface 2006 of the second housing structure 220, or the first surface 2001. For example, the at least one key input device may include a push/pull button. According to various embodiments of the disclosure, the key input device may be implemented by including various user input detection elements, such as a pressure sensor, a touch sensor, an ultrasonic sensor, an optical sensor, or a strain gauge capable of detecting a user input. The key input device may be implemented in a form exposed to the outside through an opening of the housing or a form disposed inside the housing, depending on the type of the user input detection element. According to various embodiments of the disclosure, the key input device may be omitted from the first housing structure 210 or the second housing structure 220, and may be implemented in another form, such as a soft key on the display 230. According to various embodiments of the disclosure, the key input device may include at least a part of the sensor module 176 or the haptic module 179 shown in FIG. 1.

According to various embodiments (not shown), the electronic device 200 may include an audio module. The audio module may include, for example, a microphone positioned inside a housing structure (e.g., the first housing structure 210 or the second housing structure 220), and a microphone hole formed in the housing structure to correspond to the microphone. The audio module may include, for example, a speaker located inside a housing structure (e.g., the first housing structure 210 or the second housing structure 220), and a speaker hole formed in the housing structure to correspond to the speaker. In some embodiments of the disclosure, a plurality of microphones may be disposed to detect the direction of sound. The speaker hole may include, for example, an external speaker hole or a receiver hole for a call. In some embodiments of the disclosure, the speaker hole and the microphone hole may be implemented as a single hole, or the speaker (e.g., a piezo speaker) may be included without a speaker hole.

According to various embodiments (not shown) of the disclosure, the electronic device 200 may include at least one of various sensors, such as a proximity sensor, a front camera, a light emitting device, or a receiver, disposed in the first housing structure 210 or the second housing structure 220. For example, the light emitting device may provide state information of the electronic device 200 in the form of light. In another embodiment of the disclosure, the light emitting device may provide, for example, a light source interoperating with the front camera. The light emitting device may include, for example, a light-emitting diode (LED), an IR LED, or a xenon lamp.

According to an embodiment of the disclosure, the connector holes 261, 262, and 263 may be disposed in the first housing structure 210. The connector hole 261, 262, and 263 may include, for example, a first connector hole for insertion of a connector (e.g., a USB connector) for transmitting/receiving power and/or data to/from an external electronic device, a second connector hole (e.g., an earphone jack) for insertion of a connector for transmitting/receiving an audio signal to/from an external electronic device, and a third connector hole for insertion of a memory card. The positions or number of connector holes is not limited to the example shown in FIG. 2B and may be varied.

With reference to FIG. 3, a first printed circuit board 310 may be disposed between the case 321 and the cover 322 of the first housing structure 210. Various components, such as the display 230 (see FIG. 2A), the keyboard 240, or the touch pad 250 may be electrically connected to the first printed circuit board 310 through various electrical paths. According to various embodiments of the disclosure, at least some of components included in the electronic device 101 shown in FIG. 1 may be disposed on the first printed circuit board 310 or electrically connected to the first printed circuit board 310.

According to an embodiment of the disclosure, on the first printed circuit board 310, a processor (e.g., the processor 120 in FIG. 1), a memory (e.g., the memory 130 in FIG. 1), and/or an interface (e.g., the interface 177 in FIG. 1) may be mounted. The processor may include, for example, one or more of a central processing unit, an application processor, a graphics processing unit, an image signal processor, a sensor hub processor, or a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/multimedia card (MMC) connector, or an audio connector.

A battery 330 (e.g., the battery 189 in FIG. 1) is a device for supplying power to at least one component of the electronic device 200, and may include, for example, a non-rechargeable primary battery, a rechargeable secondary battery, or a fuel cell. At least a portion of the battery 330 may be disposed, for example, on the same plane as the first printed circuit board 310. The battery 330 may be integrally disposed inside the electronic device 200 or disposed detachably from the electronic device 200.

With reference to FIG. 2A, in an embodiment of the disclosure, the electronic device 200 may include a coil disposed to overlap at least in part with the touch pad 250 when viewed from above the first surface 2001. A power transmission circuit included in the electronic device 200 may wirelessly transmit power to an external electronic device 2000 (e.g., the external electronic device 102 in FIG. 1) through the coil. The power transmission circuit may be disposed on, for example, the first printed circuit board 310 shown in FIG. 3. Because power can be wirelessly transmitted to the external electronic device 2000 placed on the touch input surface 252, the electronic device 200 can provide a user experience related to wireless charging.

According to an embodiment of the disclosure, the power transmission circuit may be of an electromagnetic induction type. For example, when a magnetic field flowing through the coil of the electronic device 200 is applied to an antenna radiator (e.g., a coil) of the external electronic device 2000, an induced current may flow through the antenna radiator. A power transmission circuit included in the external electronic device 2000 may use the induced current to provide power to a load (e.g., charge a battery). The power transmission circuit of the electromagnetic induction type may follow, for example, the wireless power consortium (WPC) standard. The electromagnetic induction type power transmission circuit in accordance with the WPC standard may wirelessly transmit power to the external electronic device 2000 using a frequency of about 110 to 205 kHz. According to various embodiments of the disclosure, the electromagnetic induction type power transmission circuit may follow the power matter alliance (PMA) standard. The electromagnetic induction type power transmission circuit in accordance with the PMA standard may wirelessly transmit power to the external electronic device using a frequency of about 227 to 357 kHz or about 118 to 153 kHz.

According to various embodiments of the disclosure, the external electronic device capable of wirelessly receiving power from the electronic device 200 is not limited to an electronic device, such as a bar-type smart phone illustrated in FIG. 2A and may include various electronic devices, such as a watch type electronic device.

According to some embodiments of the disclosure, the electronic device 200 may wirelessly receive power from the external electronic device placed on the touch input surface 252. The electronic device 200 may include a power receiving circuit electrically connected to the coil disposed to overlap at least in part with the touch pad 250. The power receiving circuit may wirelessly receive power from the external electronic device through the coil. The electronic device 200 may charge the battery by using power received from the external electronic device.

According to various embodiments of the disclosure, in case where the electronic device 200 is electrically connected to an external power source through the connector hole 262 or 263 shown in FIG. 2B, the power transmission circuit of the electronic device 200 may wirelessly transmit the power of the external power source to the external electronic device 2000 in a power transmission mode. If the battery 330 shown in FIG. 3 is not fully charged, the electronic device 200 may also charge the battery 330 by using the external power source.

According to various embodiments of the disclosure, in case where the electronic device 200 is not electrically connected to the external power source through the connector hole 262 or 263 shown in FIG. 2B, the power transmission circuit of the electronic device 200 may wirelessly transmit the power of the battery 330 shown in FIG. 3 to the external electronic device 2000 (e.g., a battery sharing function) in the power transmission mode.

According to an embodiment of the disclosure, a control circuit (e.g., the processor 120 in FIG. 1) disposed in the electronic device 200 may selectively connect the coil to the power transmission circuit or the ground of the electronic device 200. In the power transmission mode using the wireless charging function, the coil may be electrically connected to the power transmission circuit. When the wireless charging function is not used, the coil may be electrically connected to the ground.

According to an embodiment of the disclosure, the coil may be electrically connected to the ground of the electronic device 200, and thus the performance of the touch sensing circuit included in the touch pad 250 may be ensured. The coil operates as a ground, thereby shielding the touch sensing circuit from noise or reducing malfunction of the touch sensing circuit.

Figure 4:
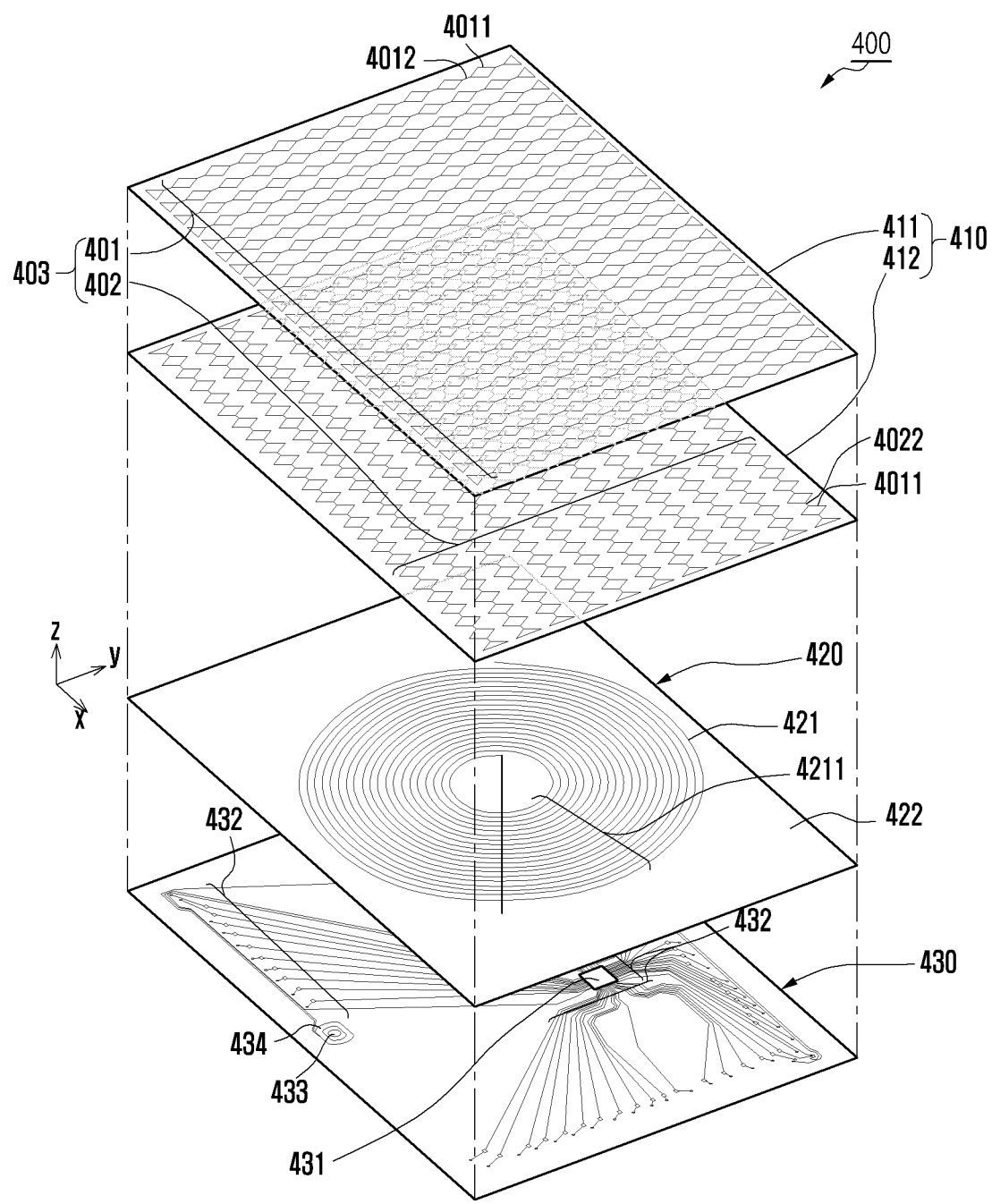
FIG. 4 is an exploded perspective view of an assembly related to a touch sensing circuit and a coil according to an embodiment of the disclosure.

FIG. 4 is an exploded perspective view of an assembly related to a touch sensing circuit and a coil according to an embodiment of the disclosure.

Referring to FIG. 4, in an embodiment of the disclosure, the assembly 400 may include a substrate 410 including a touch sensing circuit 403, a plate 420 including a coil 421, and/or a second printed circuit board 430. In various embodiments of the disclosure, the touch pad 250 shown in FIG. 2A or 3 may include the assembly 400 shown in FIG. 4.

According to an embodiment of the disclosure, the substrate 410 may include a first layer 411 and a second layer 412 that overlap with each other. The substrate 410 may include the touch sensing circuit 403 and thereby operate as a sensing panel that senses and receives a user input through the touch input surface 252 shown in FIG. 2A or 3. According to an embodiment of the disclosure, the touch sensing circuit 403 may be implemented based on a capacitive scheme. For example, the touch sensing circuit 403 may include a plurality of first electrode lines 401 disposed on the first layer 411 and a plurality of second electrode lines 402 disposed on the second layer 412. The plurality of first electrode lines 401 may be arranged at regular intervals in a first direction (e.g., the x-axis direction). The first electrode line may refer to an electrode structure (or conductive pattern) that includes, for example, a plurality of first electrodes 4011 arranged at regular intervals in the y-axis direction, and a plurality of first connection lines 4012 connecting the plurality of first electrodes 4011. The plurality of second electrode lines 402 may be arranged at regular intervals in a second direction (e.g., the y-axis direction) perpendicular to the first direction. The second electrode line may refer to an electrode structure (or conductive pattern) that includes, for example, a plurality of second electrodes 4021 arranged at regular intervals in the x-axis direction, and a plurality of second connection lines 4022 connecting the plurality of second electrodes 4021. For example, when viewed from above the first layer 411, the first electrodes of the plurality of first electrode lines 401 and the second electrodes of the plurality of second electrode lines 402 may not overlap with each other. For example, when viewed from above the first layer 411, the first connection lines of the plurality of first electrode lines 401 and the second connection lines of the plurality of second electrode lines 402 may overlap with each other.

According to an embodiment of the disclosure, the plurality of first electrode lines 401 of the first layer 411 and the plurality of second electrode lines 402 of the second layer 412 may be physically separated. For example, an insulating material may be disposed between the first layer 411 and the second layer 412. In another example, the plurality of first electrode lines 401 may be disposed on a surface that does not face the plurality of second electrode lines 402, or the plurality of second electrode lines 402 may be disposed on a surface that does not face the plurality of first electrode lines 401.

According to an embodiment of the disclosure, the first layer 411 or the second layer 412 may include a film based on various polymers, such as polyester, and a conductive layer formed by disposing or coating various conductive materials on the film. For example, the conductive material may include various conductive adhesives, such as silver paste. In some embodiments of the disclosure, the conductive material may include indium tin oxide (ITO). The conductive layer may be the plurality of first electrode lines 401 of the first layer 411 or the plurality of second electrode lines 402 of the second layer 412.

According to various embodiments of the disclosure, the plurality of first electrode lines 401 may be disposed on the surface of the first layer 411 or disposed at least in part inside the first layer 411. The plurality of second electrode lines 402 may be disposed on the surface of the second layer 412 or disposed at least in part inside the second layer 412.

According to an embodiment of the disclosure, the first layer 411 may be a transmitter (Tx), and the plurality of first electrode lines 401 may be used as driving electrodes. The second layer 412 may be a receiver (Rx), and the plurality of second electrode lines 402 may be used as sensing electrodes. According to some embodiments of the disclosure, the second layer 412 may be used as a transmitter, and the first layer 411 may be used as a receiver. A sensor (e.g., a touch controller integrated circuit (IC)) (not shown) electrically connected to the touch sensing circuit 403 may sense an intersection of the transmitter and the receiver and generate an electrical signal regarding coordinates. For example, when a voltage is applied to the plurality of electrode lines of the transmitter, capacitance may be caused by the electric field (e.g., fringing field) generated between the plurality of first electrode lines 401 and the plurality of second electrode lines 402. When a finger contacts the touch input surface 252 shown in FIG. 2A or 3 or reaches within a threshold distance from the touch input surface 252, a variation in the capacitance value may be greater than a threshold value. When the variation in the capacitance value becomes greater than the threshold value, the sensor electrically connected to the touch sensing circuit 403 may generate an electrical signal regarding coordinates as a valid touch input or hovering input and output it to a processor (e.g., the processor 120 in FIG. 1). The processor may recognize the coordinates based on the electrical signal received from the sensor.

According to various embodiments (not shown) of the disclosure, the substrate 410 including the touch sensing circuit 403 is not limited to the embodiment shown in FIG. 4 and may be implemented as a substrate including a touch sensing circuit of various other forms of capacitive scheme.

According to an embodiment of the disclosure, on the second printed circuit board 430, various electronic components, such as an integrated circuit (IC), a capacitor, a resistor, or an inductor, associated with the touch sensing circuit 403 of the substrate 410, and related conductive lines 432 may be disposed. The touch sensing circuit 403 may be electrically connected to various electronic components disposed on the second printed circuit board 430 through the conductive lines 432 of the second printed circuit board 430. The second printed circuit board 430 may be electrically connected to the first printed circuit board 310 shown in FIG. 3 through various electrical paths, such as a flexible printed circuit board (FPCB) or a cable.

According to an embodiment of the disclosure, the touch controller IC 431 may be disposed on the second printed circuit board 430 and electrically connected to the touch sensing circuit 403 of the substrate 410 through the second printed circuit board 430. The touch controller IC 431 may convert an analog signal obtained through the touch sensing circuit 403 into a digital signal. For example, the touch controller IC 431 may convert an analog signal of the touch sensing circuit 403 into a digital signal to obtain a coordinate form to be represented on the screen. According to various embodiments of the disclosure, the touch controller IC 431 may perform various functions, such as noise filtering, noise removal, and sensing data extraction in relation to the touch sensing circuit 403 of the substrate 410. According to various embodiments of the disclosure, the touch controller IC 431 may include various circuits, such as an analog-digital converter (ADC), a digital signal processor (DSP), and/or a micro control unit (MCU).

According to an embodiment of the disclosure, the second printed circuit board 430 may include a first conductive terminal 433 and a second conductive terminal 434 for disposing a metal dome (not shown). The first conductive terminal 433 may be disposed inside the second conductive terminal 434. The edge of the metal dome may be connected to the second conductive terminal 434. When a corresponding portion of the touch input surface 252 shown in FIG. 2A or 3 is pressed, the metal dome is deformed to come into contact with the first conductive terminal 433, and thus the first and second conductive terminals 433 and 434 are electrically connected.

According to various embodiments of the disclosure, the substrate 410 including the touch sensing circuit 403 is not limited to the capacitive scheme according to the embodiment of FIG. 4 and may be implemented in various other schemes. For example, the touch sensing circuit may be implemented in a resistant overlay scheme, an infrared beam scheme, or a surface acoustic wave scheme.

In case of the resistant overlay scheme, two layers of, for example, glass and a film coated with various conductive materials may be included. For example, the conductive material may include various conductive adhesives, such as silver paste. In some embodiments of the disclosure, the conductive material may include indium tin oxide (ITO). When the touch input surface (e.g., the touch input surface 252 in FIG. 2A or 3) is pressed with a finger, the two layers come into contact with each other and electrical contact occurs, which may cause a variation in resistance or voltage. The sensor (e.g., the touch controller IC) may generate an electrical signal regarding the coordinates of a user input, based on the variation in resistance or voltage.

The infrared beam scheme utilizes the property that infrared rays are blocked when they collide with obstacles due to their linearity. In case of the infrared beam scheme, a matrix in which a light emitting device (e.g., an infrared LED) and a light receiving device (e.g., a phototransistor) are disposed to face each other may be included. When an object, such as a finger is placed in the matrix, the output may be reduced in a portion where the light is blocked. The sensor (e.g., the touch controller IC) may generate an electrical signal regarding the coordinates of a user input, based on the reduction in the output.

The surface acoustic wave scheme uses propagation characteristics of sound and may include, for example, an ultrasonic transmitter and an ultrasonic receiver. When an object blocks the propagation of the sound wave outputted from the ultrasonic transmitter, the ultrasonic receiver may not receive the sound wave. The sensor may generate an electrical signal regarding the coordinates of a user input, based on a time when the ultrasound receiver does not receive the sound wave.

According to an embodiment of the disclosure, the plate 420 including the coil 421 may be disposed between the substrate 410 and the second printed circuit board 430. When viewed from above the substrate 410, the coil 421 may overlap at least in part with the substrate 410. The coil 421 may be a loop-type antenna radiator and may be formed, for example, in a planar helical conductive pattern having a plurality of turns 4211.

According to an embodiment of the disclosure, the control circuit (e.g., the processor 120 in FIG. 1) disposed on the first printed circuit board 310 shown in FIG. 3 may selectively connect the coil 421 to the power transmission circuit or the ground disposed on the first printed circuit board 310 shown in FIG. 3. The ground may include, for example, a ground plane 311 disposed on the first printed circuit board 310 shown in FIG. 3.

For example, the control circuit may provide a first state in which the coil 421 is not electrically connected to the ground and is electrically connected to the power transmission circuit. The first state may correspond to a power transmission mode using a wireless charging function. For example, the control circuit may provide a second state in which the coil 421 is electrically connected to the ground and is not electrically connected to the power transmission circuit. The first state or the second state may be determined based at least in part on a user input or based at least in part on whether an external electronic device related to wireless charging is in proximity to the electronic device 200.

According to an embodiment of the disclosure, in the second state, the coil 421 is electrically connected to the ground (e.g., the ground plane 311 in FIG. 3) of the electronic device 200, thereby operating as a ground member for the touch sensing circuit 403. In the second state, the performance of the touch sensing circuit 403 may be ensured by the coil 421 operating as the ground member. For example, the coil 421 overlaps with the touch sensing circuit 403 and operates as the ground, thereby shielding the touch sensing circuit 403 from noise or reducing malfunction of the touch sensing circuit.

According to an embodiment of the disclosure, in the second state, the coil 421 may prevent interference between the transmitter (e.g., the first layer 411) and the receiver (e.g., the second layer 412) of the touch sensing circuit 403. According to an embodiment of the disclosure, in the second state, the coil 421 may reduce the influence of external noise on the touch sensing circuit 403. According to an embodiment of the disclosure, in the second state, the coil 421 may reduce the influence of noise generated inside the electronic device 200 (see FIG. 2A) on the touch sensing circuit 403. In the second state, the coil 421 may absorb or block noise. For example, noise from various electrical elements, such as the second printed circuit board 430 around the assembly 400, is blocked by the coil 421 acting as the ground in the second state, so it is difficult to reach the touch sensing circuit 403.

Figure 5:
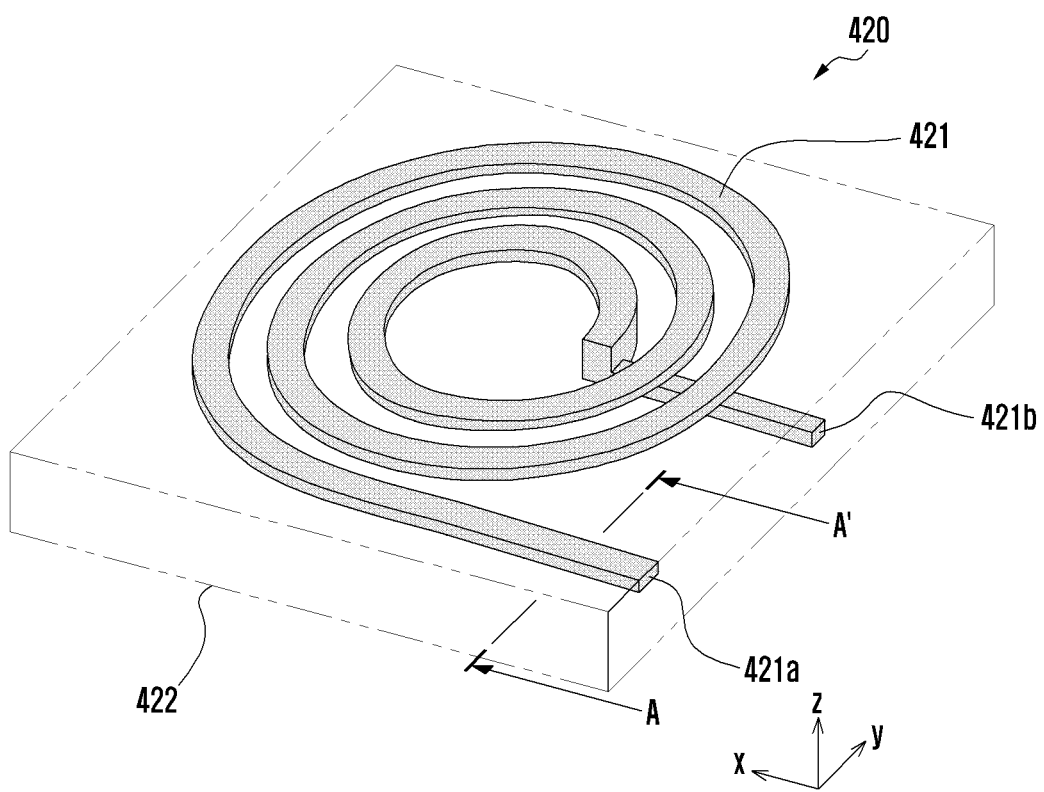
FIG. 5 is a perspective view showing a schematic structure of a plate including a coil shown in FIG. 4 according to an embodiment of the disclosure.

FIG. 5 is a perspective view showing a schematic structure of a plate including a coil shown in FIG. 4 according to an embodiment of the disclosure.

Referring to FIG. 5, in an embodiment of the disclosure, the coil 421 may be formed of a spiral conductive pattern extending from one end 421a to the other end 421b. The one end 421a and/or the other end 421b may be electrically connected to the power transmission circuit in the power transmission mode. When the power transmission mode is not used, the one end 421a and/or the other end 421b may not be electrically connected to the power transmission circuit. With reference to FIGS. 4 and 5, for example, the one end 421a and the other end 421b of the coil 421 may be electrically connected to the second printed circuit board 430. With reference to FIGS. 3, 4 and 5, the power transmission circuit disposed on the first printed circuit board 310 may be electrically connected to the coil 421 through an electrical path between the first and second printed circuit boards 310 and 430 and through the second printed circuit board 430. According to some embodiments of the disclosure, the one end 421a and the other end 421b of the coil 421 may be directly connected to the first printed circuit board 310 on which the power transmission circuit is disposed.

With reference to FIGS. 4 and 5, in an embodiment of the disclosure, the plate 420 including the coil 421 may include a conductive plate 422 on which the coil 421 is disposed. The conductive plate 422 may be disposed to overlap at least in part with the substrate 410 when viewed from above the substrate 410. The conductive plate 411 may be electrically connected to the ground (e.g., the ground plane 311 in FIG. 3) of the electronic device 200. According to an embodiment of the disclosure, in the second state, the conductive plate 411 may contribute to ensuring the performance of the touch sensing circuit 403 together with the coil 421.

According to an embodiment of the disclosure, the coil 421 may be disposed on one surface of the conductive plate 422 facing the substrate 410. If the conductive plate 422 is disposed between the substrate 410 and the coil 421, the energy (or electromagnetic field) generated from the coil 421 in the power transmission mode may be difficult to radiate toward the touch input surface 252 shown in FIG. 2A due to the conductive plate 422. If the conductive plate 422 is disposed between the substrate 410 and the coil 421, at least part of energy generated from the coil 421 in the power transmission mode may not pass through the conductive plate 422 and may be induced to the conductive plate 422. If the conductive plate 422 is disposed between the substrate 410 and the coil 421, the magnetic flux generated from the coil 421 in the power transmission mode may be reduced due to the conductive plate 422 which is a conductive medium. According to an embodiment of the disclosure, when the coil 421 is disposed between the conductive plate 422 and the substrate 410, the energy radiated from the coil 421 or magnetic flux generated from the coil 421 may proceed toward the touch input surface 252 shown in FIG. 2A without substantial influence due to the conductive plate 422.

According to various embodiments of the disclosure, the plate 420 including the coil 421 shown in FIG. 4 or 5 may also be implemented as a printed circuit board. For example, the plate 420 may be formed of a multilayer printed circuit board (or multiple printed circuit board). The multilayer printed circuit board may include a plurality of conductive layers each having a conductive pattern, and insulating and adhesive materials (e.g., various kinds of prepreg, such as epoxy) disposed between the conductive layers. The plurality of conductive layers may form the coil 421 or conductive pattern 422 physically separated. According to various embodiments of the disclosure, conductive patterns disposed on different layers among the plurality of conductive layers may be electrically connected through vias (e.g., through-holes plated with a conductive material) and may form a coil extending from one end to the other end and spirally ascending in the z-axis direction.

According to various embodiments of the disclosure, the plate 420 including the coil 421 may be formed based on copper clad laminates (CCL). According to various embodiments of the disclosure, the plate 420 including the coil 421 may be implemented as a flexible printed circuit board. In this case, it may be formed based on a flexible copper clad laminate (FCCL). The CCL or the FCCL is a laminate used for printed circuits and may have a structure in which copper foil is adhered to one or both surfaces of an insulating layer (or insulating plate) including various insulating material bases (e.g., resin) and a binder.

According to some embodiments of the disclosure, the plate 420 including the coil 421 may be implemented as a double-sided printed circuit board having circuits (or conductive patterns) formed on both sides. For example, the double-sided printed circuit board may include an insulating layer, a first conductive layer disposed on one side of the insulating layer to form a coil, and a second conductive layer disposed on the other side of the insulating layer to serve as the conductive plate 422.

According to some embodiments (not shown), the coil 421 is not limited to a circular coil shown in the embodiment of FIG. 4 or 5 and may be formed in various other shapes, such as a rectangular coil.

According to some embodiments of the disclosure, the conductive plate 422 may be omitted, and the first coil 421 may be expanded to replace the conductive plate 422.

Figure 6:
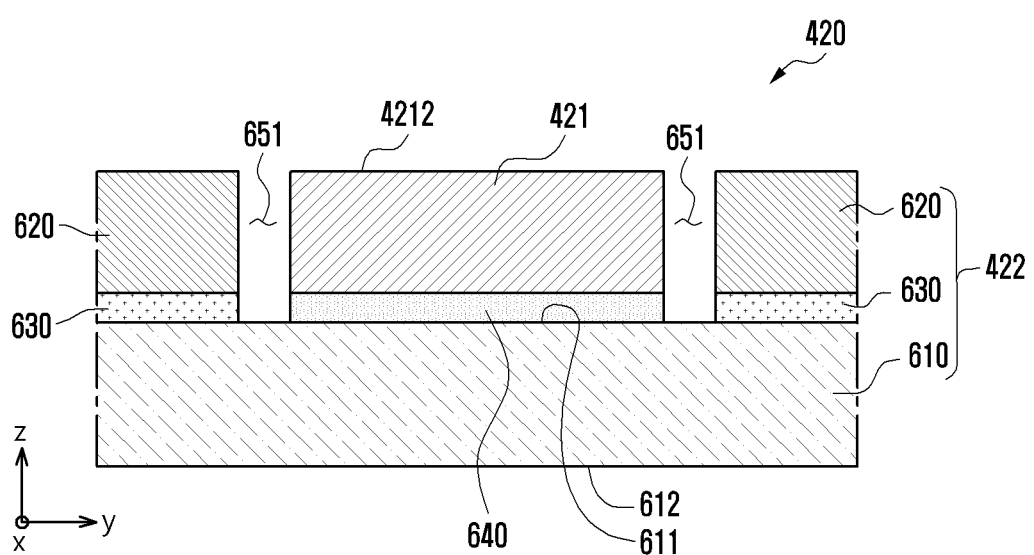
FIG. 6 is a cross-sectional view taken along line A-A' in a plate shown in FIG. 5A according to an embodiment of the disclosure.

FIG. 6 is a cross-sectional view taken along line A-A' in a plate shown in FIG. 5A according to an embodiment of the disclosure.

Referring to FIG. 6, in an embodiment of the disclosure, the plate 420 may include the coil 421 and the conductive plate 422.

According to an embodiment of the disclosure, the conductive plate 422 may include a first conductive part 610, a second conductive part 620, and/or a conductive bonding material 630.

With reference to FIGS. 4 and 6, in an embodiment of the disclosure, the first conductive part 610 may have a first surface 611 facing the substrate 410 and a second surface 612 disposed on the opposite side to the first surface 611 and facing the second printed circuit board 430.

According to an embodiment of the disclosure, the second conductive part 620 may be bonded to the first surface 611 of the first conductive part 610 through the conductive bonding material 630. The second conductive part 620 may be electrically connected to the first conductive part 610 through the conductive bonding material 630. The first conductive part 610 and the second conductive part 620 may be formed of the same conductive material or different conductive materials. According to some embodiments of the disclosure, the first conductive part 610 and the second conductive part 620 may be formed as an integral conductive part without the conductive bonding material 630.

According to an embodiment of the disclosure, the coil 421 may be bonded to the first conductive part 610 through a non-conductive bonding material (or an insulating bonding material) 640. The coil 421 may be electrically isolated from the first conductive part 610 by the non-conductive bonding material 640.

According to an embodiment of the disclosure, the second conductive part 620 may be disposed in a region where the coil 421 is not disposed on the first surfaces 611 of the first conductive part 610. The second conductive part 620 may be physically and electrically separated from the coil 421. For example, the second conductive part 620 may be disposed with a separation space 651 from the coil 421. According to various embodiments of the disclosure, various insulating materials may be filled in the separation space 651, and the insulating material may contribute to rigidity or durability of the plate 420 including the coil 421. According to an embodiment of the disclosure, with reference to FIGS. 4 and 6, the second conductive part 620 may be disposed so as not to cover one surface 4212 of the coil 421 facing the substrate 410.

According to an embodiment of the disclosure, the conductive plate 422 may not be substantially disposed between the substrate 410 and the coil 421 shown in FIG. 4, and the energy radiated from the coil 421 or the magnetic flux generated from the coil 421 may travel toward the touch input surface 252 shown in FIG. 2A without substantial influence by the conductive plate 422.

According to an embodiment of the disclosure, the second conductive part 620 may be formed so as not to protrude in a direction (e.g., the z-axis direction) toward the substrate 410 shown in FIG. 4 with respect to the coil 421. According to some embodiments (not shown) of the disclosure, the coil 421 may be formed to protrude in the direction toward the substrate 410 of FIG. 4 with respect to the second conductive part 620. Therefore, the energy radiated from the coil 421 or the magnetic flux generated from the coil 421 may travel toward the touch input surface 252 shown in FIG. 2A without substantial influence by the conductive plate 422.

According to some embodiments of the disclosure, the second conductive part 620 and the conductive bonding material 630 related thereto may be omitted.

According to various embodiments of the disclosure, the cross-sectional structure shown in FIG. 6 may be formed substantially similarly or identically even in other portions of the plate 420 shown in FIG. 5A.

In various embodiments of the disclosure, with reference to FIG. 4, the structure that includes the substrate 410 including the touch sensing circuit 403 and the plate 420 including the coil 421 is not limited to the touch pad 250 shown in FIG. 2A and may also be applied to various electronic devices including a display with a touch sensing circuit. For example, the display may have a ground layer that includes a touch sensing circuit and a coil overlapping at least in part with the touch sensing circuit. Such a ground layer may be implemented at least similar or identical to the plate 420 shown in FIG. 4, 5, or 6.

Figure 7:
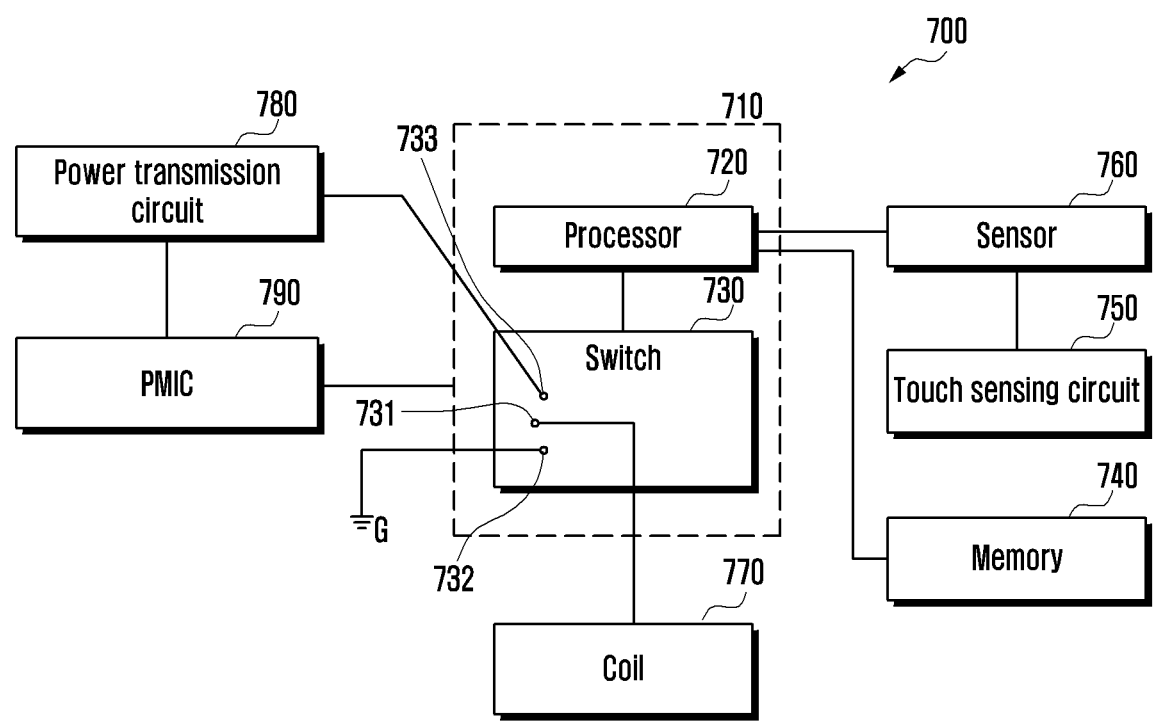
FIG. 7 is a block diagram of an electronic device according to an embodiment of the disclosure.

FIG. 7 is a block diagram of an electronic device according to an embodiment of the disclosure.

Referring to FIG. 7, in an embodiment of the disclosure, the electronic device 700 may include a control circuit 710, a memory 740, a touch sensing circuit 750, a sensor 760, a coil 770, a power transmission circuit 780, a ground G, and/or a power management integrated circuit 790. According to various embodiments of the disclosure, the electronic device 700 shown in FIG. 7 may include the electronic device 101 shown in FIG. 1 or the electronic device 200 shown in FIG. 2A or 3.

According to an embodiment of the disclosure, the touch sensing circuit 750 may operate as a sensing panel that detects and receives a touch input or a hovering input. For example, the touch sensing circuit 750 may include the touch sensing circuit 403 shown in FIG. 4.

According to an embodiment of the disclosure, the sensor 760 may convert an analog signal obtained through the touch sensing circuit 750 into a digital signal regarding coordinates. For example, the sensor 760 may include the touch controller IC 431 shown in FIG. 4.

According to an embodiment of the disclosure, the coil 770 may be disposed to overlap at least in part with the touch sensing circuit 750 in the form of a sensing panel. For example, the coil 770 may include the coil 421 shown in FIG. 4.

According to an embodiment of the disclosure, the power transmission circuit 780 may wirelessly transmit power to an external electronic device through the coil 770.

According to an embodiment of the disclosure, the ground G may include, for example, the ground plane 311 disposed on the first printed circuit board 310 shown in FIG. 3. According to various embodiments of the disclosure, the ground G may be various types of ground members disposed in the electronic device 700.

According to an embodiment of the disclosure, the power management integrated circuit (PMIC) 790 may be electrically connected to the control circuit 710 and the power transmission circuit 780. The PMIC 790 may include the power management module 188 shown in FIG. 1. The PMIC 790 may efficiently manage and optimize the power usage within the system. For example, the control circuit 710 may transmit a signal corresponding to a load to be processed to the PMIC 790. For example, the PMIC 790 may adjust a core voltage supplied to the processor 720 to be adequate.

According to an embodiment of the disclosure, the PMIC 790 may optimize power distribution between the battery charging circuit and the system power supply when the power transmission circuit 780 is electrically connected to the control circuit 710. According to various embodiments of the disclosure, the PMIC 790 may be implemented to include the power transmission circuit 780.

According to an embodiment of the disclosure, the control circuit 710 may include a processor 720 and a switch 730. For example, the switch 730 may include a first terminal 731, a second terminal 732, or a third terminal 733. The first terminal 731 may be electrically connected to the coil 770. The second terminal 732 may be electrically connected to the ground G. The third terminal 733 may be electrically connected to the power transmission circuit 780. Under the control of the processor 720, the switch 730 may electrically connect the first terminal 731 to the second terminal 732 or the third terminal 733.

According to an embodiment of the disclosure, the memory 740 (e.g., the memory 130 in FIG. 1) may store a software-related program (a set of instructions) executable by the processor 720 (e.g., the processor 120 in FIG. 1). The memory 740 may store instructions (e.g., the program 140 in FIG. 1) for the processor 720 to control the coil 770.

According to an embodiment of the disclosure, the control circuit 710 may provide a first state in which the coil 770 is electrically connected to the power transmission circuit 780 and is not electrically connected to the ground G. The control circuit 710 may provide a second state in which the coil 770 is electrically connected to the ground G and is not electrically connected to the power transmission circuit 780. In the first state, the switch 730 may electrically connect the first terminal 731 to the third terminal 733. In the second state, the switch 730 may electrically connect the first terminal 731 to the second terminal 732.

According to an embodiment of the disclosure, the processor 720 may provide the first state when the power transmission mode (e.g., the wireless charging mode) is used. The processor 720 may provide the second state when the power transmission mode is not used.

Figure 8:
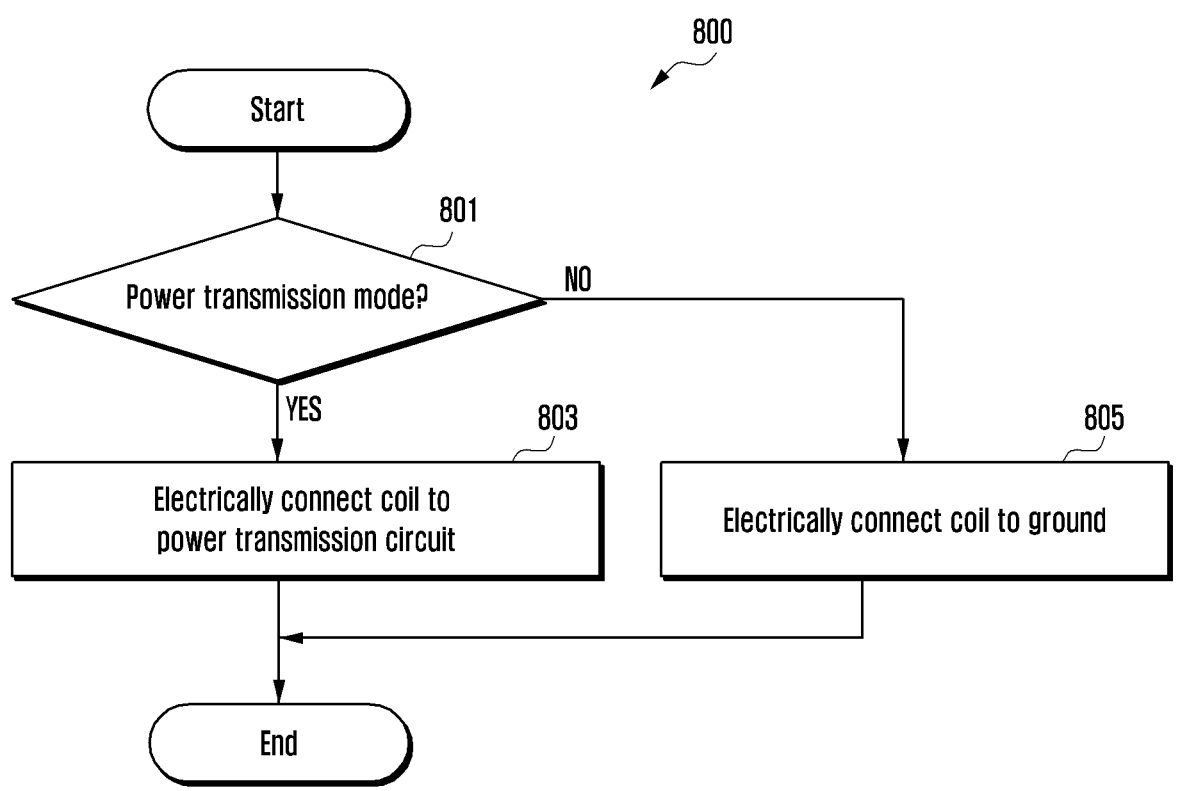
FIG. 8 illustrates an operation flow of an electronic device shown in FIG. 7 according to an embodiment of the disclosure.

FIG. 8 illustrates an operation flow 800 of an electronic device shown in FIG. 7 according to an embodiment of the disclosure.

Referring to FIGS. 7 and 8, in an embodiment of the disclosure, the processor 720 (or the control circuit 710) may identify at operation 801 whether the power transmission mode (e.g., the wireless charging mode) is executed.

According to an embodiment of the disclosure, the electronic device 700 may further include a user interface. The user interface may include various input devices capable of receiving a user input. For example, the user interface may include the input device 150 shown in FIG. 1 or the keyboard 240 shown in FIG. 2A. Based at least in part on a user input through the user interface, the power transmission mode may or may not be executed.

According to various embodiments of the disclosure, the electronic device 700 may further include at least one sensor (e.g., the sensor module 176 in FIG. 1). The at least one sensor may detect a case in which an external electronic device is located near the coil 770. For example, with reference to FIG. 2A, the at least one sensor may detect the external electronic device 2000 placed on the touch input surface 252. Based at least in part on whether the external electronic device is in proximity to the coil 770, the power transmission mode may or may not be executed.

According to an embodiment of the disclosure, when it is identified that the power transmission mode is executed, the processor 720 may electrically connect the coil 770 to the power transmission circuit 780 at operation 803.

According to an embodiment of the disclosure, if it is identified that the power transmission mode is not executed, the processor 720 may electrically connect the coil 770 to the ground G at operation 805.

According to an embodiment of the disclosure, the coil 770 may be electrically connected to the ground G and thereby operate as a ground member for the touch sensing circuit 750. The performance of the touch sensing circuit 750 may be ensured by the coil 770 operating as the ground member. For example, the coil 770 overlaps with the touch sensing circuit 750 and operates as the ground, thereby shielding the touch sensing circuit 403 from noise or reducing malfunction of the touch sensing circuit.

According to various embodiments of the disclosure, the electronic device 700 shown in FIG. 7 may further include a power receiving circuit. The power receiving circuit may wirelessly receive power from an external electronic device through the coil 770. According to various embodiments of the disclosure, the control circuit 710 may provide a third state in which the coil 770 is not electrically connected to the ground G and is electrically connected to the power receiving circuit. The control circuit 710 may provide a fourth state in which the coil 770 is electrically connected to the ground G and is not electrically connected to the power receiving circuit. In the third state, the switch 730 may electrically connect the first terminal 731 to the third terminal 733. In the fourth state, the switch 730 may electrically connect the first terminal 731 to the second terminal 732. The processor 720 may provide the third state when a power reception mode (e.g., a wireless charging mode) is used. The processor 720 may provide the fourth state when the power reception mode is not used. According to various embodiments of the disclosure, replacing the power transmission circuit 780 and the power reception circuit, a power transmission/reception circuit that supports the power transmission mode and the power reception mode may be implemented.

According to an embodiment of the disclosure, an electronic device (e.g., the electronic device 200 in FIG. 2A) may include a substrate (e.g., the substrate 410 in FIG. 4). The substrate may include a first layer (e.g., the first layer 411 in FIG. 4) and a second layer (e.g., the second layer 412 in FIG. 4) overlapping with the first layer. The substrate may include a touch sensing circuit (e.g., the touch sensing circuit 403 in FIG. 4) including a plurality of first electrode lines (e.g., the plurality of first electrode lines 401 in FIG. 4) arranged on the first layer in a first direction, and a plurality of second electrode lines (e.g., the plurality of second electrode lines 402 in FIG. 4) arranged on the second layer in a second direction perpendicular to the first direction. The electronic device may include a coil (e.g., the coil 421 in FIG. 4) disposed to overlap at least in part with the substrate. The electronic device may include a power transmission circuit (e.g., the power transmission circuit 780 in FIG. 7) for wirelessly transmitting power through the coil. The electronic device may include a ground (e.g., the ground G in FIG. 7) electrically connected to the power transmission circuit. The electronic device may include a control circuit (e.g., the control circuit 710 in FIG. 7) electrically connected to the coil and the ground. The control circuit may be configured to selectively connect the coil to the power transmission circuit or the ground.

According to an embodiment of the disclosure, the control circuit (e.g., the control circuit 710 in FIG. 7) may provide a first state in which the coil (e.g., the coil 421 in FIG. 4) is not electrically connected to the ground (e.g., the ground plane 311 in FIG. 3) and is electrically connected to the power transmission circuit (e.g., the power transmission circuit 780 in FIG. 7). The control circuit may provide a second state in which the coil is electrically connected to the ground and is not electrically connected to the power transmission circuit.

According to an embodiment of the disclosure, the control circuit (e.g., the control circuit 710 in FIG. 7) may include a switch (e.g., the switch 730 in FIG. 7) having a first terminal (e.g., the first terminal 731 in FIG. 7), a second terminal (e.g., the second terminal 732 in FIG. 7), and a third terminal (e.g., the third terminal 733 in FIG. 7). The first terminal may be electrically connected to the coil (e.g., the coil 421 in FIG. 4). The second terminal may be electrically connected to the ground (e.g., the ground plane 311 in FIG. 3). The third terminal may be electrically connected to the power transmission circuit (e.g., the power transmission circuit 780 in FIG. 7). The switch may electrically connect the first terminal to the third terminal in the first state. The switch may electrically connect the first terminal to the second terminal in the second state.

According to an embodiment of the disclosure, the electronic device may further include a user interface, and the control circuit (e.g., the control circuit 710 in FIG. 7) may selectively provide the first state or the second state, based at least in part on a user input received through the user interface.

According to an embodiment of the disclosure, the control circuit (e.g., the control circuit 710 in FIG. 7) may selectively provide the first state or the second state, based at least in part on whether an external electronic device is in proximity to the coil (e.g., the coil 421 in FIG. 4).

According to an embodiment of the disclosure, the electronic device may further include a conductive plate (e.g., the conductive plate 422 in FIG. 4) disposed to overlap at least in part with the substrate (e.g., the substrate 410 in FIG. 4). The coil (e.g., the coil 421 in FIG. 4) may be bonded to the conductive plate through a non-conductive bonding material (e.g., the non-conductive bonding material 640 in FIG. 6) between the substrate and the conductive plate, and be electrically isolated from the conductive plate.

According to an embodiment of the disclosure, the conductive plate (e.g., the conductive plate 422 in FIG. 4) may be electrically connected to the ground (e.g., the ground plane 311 in FIG. 3).

According to an embodiment of the disclosure, the conductive plate (e.g., the conductive plate 422 in FIG. 6) may include a first conductive part (e.g., the first conductive part 610 in FIG. 6) having a first surface (e.g., the first surface 611 in FIG. 6) facing the substrate (e.g., the substrate 410 in FIG. 4) and on which the coil (e.g., the coil 421 in FIG. 6) is disposed, and a second surface (e.g., the second surface 612 in FIG. 6) facing opposite to the first surface. The conductive plate may include a second conductive part (e.g., the second conductive part 620 in FIG. 6) disposed on the first surface and physically separated from the coil.

According to an embodiment of the disclosure, a conductive bonding material (e.g., the conductive bonding material 630 in FIG. 6) may be disposed between the second conductive part (e.g., the second conductive part 620 in FIG. 6) and the first surface (e.g., the first surface 611 in FIG. 6).

According to an embodiment of the disclosure, the first conductive part (e.g., the first conductive part 610 in FIG. 6) and the second conductive part (e.g., the second conductive part 620 in FIG. 6) may be integrally formed and have same conductive material.

According to an embodiment of the disclosure, the coil (e.g., the coil 421 in FIG. 6) and the conductive plate (e.g., the conductive plate 422 in FIG. 6) may have different conductive materials.

According to an embodiment of the disclosure, the electronic device may further include a flexible printed circuit board including the coil (e.g., the coil 421 in FIG. 4).

According to an embodiment of the disclosure, the flexible printed circuit board may further include at least one conductive pattern (e.g., the conductive plate 422 in FIG. 4) that is not disposed between the substrate (e.g., the substrate 410 in FIG. 4) and the coil (e.g., the coil 421 in FIG. 4) and is physically separated from the coil. The at least one conductive pattern may be electrically connected to the ground (e.g., the ground plane 311 in FIG. 3).

According to an embodiment of the disclosure, the electronic device may further include a printed circuit board (e.g., the second printed circuit board 430 in FIG. 4) that overlaps at least in part with the substrate (e.g., the substrate 410 in FIG. 4). The coil (e.g., the coil 421 in FIG. 4) may be disposed between the substrate (e.g., the substrate 410 in FIG. 4) and the printed circuit board. The touch sensing circuit (e.g., the touch sensing circuit 403 in FIG. 4) may be electrically connected to a touch controller integrated circuit (IC) (e.g., the touch controller IC 431 in FIG. 4) disposed on the printed circuit board.

According to an embodiment of the disclosure, the electronic device may further include a foldable housing. The foldable housing may include a first housing structure (e.g., the first housing structure 210 in FIG. 2A) having a first surface and a second surface opposite to the first surface. The foldable housing may include a second housing structure (e.g., the second housing structure 220 in FIG. 2A) having a third surface and a fourth surface opposite to the third surface. The foldable housing may include a hinge structure connecting the first housing structure and the second housing structure. The first surface and the third surface may face each other when the first housing structure and the second housing structure are folded around the hinge structure. The electronic device may include a touch pad (e.g., the touch pad 250 in FIG. 2A) disposed within the first housing structure and forming a portion of the first surface. The electronic device may include a display (e.g., the display 230 in FIG. 2A) disposed within the second housing structure and forming at least a portion of the second surface. The touch pad may include the substrate (e.g., the substrate 410 in FIG. 4) including the touch sensing circuit (e.g., the touch sensing circuit 403 in FIG. 4).

According to an embodiment of the disclosure, the electronic device may further include a power receiving circuit that wirelessly receives power through a coil (e.g., the coil 770 in FIG. 7). The control circuit (e.g., the control circuit 710 in FIG. 7) may be configured to selectively connect the coil to the power receiving circuit or the ground (e.g., the ground G in FIG. 7).

According to an embodiment of the disclosure, the control circuit (e.g., the control circuit 710 in FIG. 7) may provide a third state in which the coil (e.g., the coil 770 in FIG. 7) is not electrically connected to the ground (e.g., the ground G in FIG. 7) and is electrically connected to the power receiving circuit, or a fourth state in which the coil is electrically connected to the ground and is not electrically connected to the power receiving circuit.

According to an embodiment of the disclosure, the control circuit (e.g., the control circuit 710 in FIG. 7) may include a switch (e.g., the switch 730 in FIG. 7) having a first terminal (e.g., the first terminal 731 in FIG. 7), a second terminal (e.g., the second terminal 732 in FIG. 7), and a third terminal (e.g., the third terminal 733 in FIG. 7). The first terminal may be electrically connected to the coil (e.g., the coil 421 in FIG. 4). The second terminal may be electrically connected to the ground (e.g., the ground plane 311 in FIG. 3). The third terminal may be electrically connected to the power receiving circuit. The switch may electrically connect the first terminal to the third terminal in the third state. The switch may electrically connect the first terminal to the second terminal in the fourth state.

According to various embodiments of the disclosure, the electronic device (e.g., the electronic device 200 in FIG. 2A) may include a foldable housing. The foldable housing may include a first housing structure (e.g., the first housing structure 210 in FIG. 2A) having a first surface and a second surface opposite to the first surface. The foldable housing may include a second housing structure (e.g., the second housing structure 220 in FIG. 2A) having a third surface and a fourth surface opposite to the third surface. The foldable housing may include a hinge structure connecting the first housing structure and the second housing structure. The first surface and the third surface may face each other when the first housing structure and the second housing structure are folded around the hinge structure. The electronic device may include a touch pad (e.g., the touch pad 250 in FIG. 2A) disposed within the first housing structure and forming a portion of the first surface. The touch pad may include a substrate (e.g., the substrate 410 in FIG. 4). The substrate may include a first layer (e.g., the first layer 411 in FIG. 4) and a second layer (e.g., the second layer 412 in FIG. 4) overlapping with the first layer. The substrate may include a touch sensing circuit (e.g., the touch sensing circuit 403 in FIG. 4) including a plurality of first electrode lines (e.g., the plurality of first electrode lines 401 in FIG. 4) arranged on the first layer in a first direction, and a plurality of second electrode lines (e.g., the plurality of second electrode lines 402 in FIG. 4) arranged on the second layer in a second direction perpendicular to the first direction. The touch pad may include a coil (e.g., the coil 421 in FIG. 4) disposed between the substrate and the second surface to overlap at least in part with the substrate. The electronic device may include a display (e.g., the display 230 in FIG. 2A) disposed within the second housing structure and forming at least a portion of the second surface. The electronic device may include a power transmission circuit (e.g., the power transmission circuit 780 in FIG. 7) for wirelessly transmitting or receiving power through the coil. The electronic device may include a ground (e.g., the ground G in FIG. 7) electrically connected to the power transmission circuit. The electronic device may include a control circuit (e.g., the control circuit 710 in FIG. 7) electrically connected to the coil and the ground. The control circuit may be configured to selectively connect the coil to the power transmission circuit or the ground.

According to various embodiments of the disclosure, the control circuit (e.g., the control circuit 710 in FIG. 7) may provide a first state in which the coil (e.g., the coil 421 in FIG. 4) is not electrically connected to the ground (e.g., the ground plane 311 in FIG. 3) and is electrically connected to the power transmission circuit (e.g., the power transmission circuit 780 in FIG. 7). The control circuit may provide a second state in which the coil is electrically connected to the ground and is not electrically connected to the power transmission circuit. The control circuit (e.g., the control circuit 710 in FIG. 7) may include a switch (e.g., the switch 730 in FIG. 7) having a first terminal (e.g., the first terminal 731 in FIG. 7), a second terminal (e.g., the second terminal 732 in FIG. 7), and a third terminal (e.g., the third terminal 733 in FIG. 7). The first terminal may be electrically connected to the coil (e.g., the coil 421 in FIG. 4). The second terminal may be electrically connected to the ground (e.g., the ground plane 311 in FIG. 3). The third terminal may be electrically connected to the power transmission circuit (e.g., the power transmission circuit 780 in FIG. 7). The switch may electrically connect the first terminal to the third terminal in the first state. The switch may electrically connect the first terminal to the second terminal in the second state.

The embodiments of the disclosure are only examples presented in order to easily explain technical contents and facilitate comprehension of the disclosure, and are not intended to limit the technical scope of the disclosure. Therefore, the technical scope of the disclosure should be construed to include all changes or modifications derived from the technical ideas of various embodiments of the disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a substrate including:
      a first layer and a second layer overlapping with the first layer; and
      a touch sensing circuit including a plurality of first electrode lines arranged on the first layer in a first direction, and a plurality of second electrode lines arranged on the second layer in a second direction perpendicular to the first direction;
   a coil disposed to overlap at least in part with the substrate;
   a power transmission circuit for wirelessly transmitting power through the coil;
   a ground electrically connected to the power transmission circuit; and
   a control circuit electrically connected to the coil and the ground,
   wherein the control circuit is configured to selectively connect the coil to the power transmission circuit or the ground.

2. The electronic device of claim 1, wherein the control circuit provides:
   a first state in which the coil is not electrically connected to the ground and is electrically connected to the power transmission circuit; or
   a second state in which the coil is electrically connected to the ground and is not electrically connected to the power transmission circuit.

3. The electronic device of claim 2,
   wherein the control circuit includes a switch having a first terminal, a second terminal, and a third terminal,
   wherein the first terminal is electrically connected to the coil,
   wherein the second terminal is electrically connected to the ground,
   wherein the third terminal is electrically connected to the power transmission circuit, and
   wherein the switch electrically connects the first terminal to the third terminal in the first state, and electrically connects the first terminal to the second terminal in the second state.

4. The electronic device of claim 2, further comprising:
   a user interface,
   wherein the control circuit selectively provides the first state or the second state, based at least in part on a user input received through the user interface.

5. The electronic device of claim 2, wherein the control circuit selectively provides the first state or the second state, based at least in part on whether an external electronic device is in proximity to the coil.

6. The electronic device of claim 1, further comprising:
   a conductive plate disposed to overlap at least in part with the substrate,
   wherein the coil is bonded to the conductive plate through a non-conductive bonding material between the substrate and the conductive plate, and is electrically isolated from the conductive plate.

7. The electronic device of claim 6, wherein the conductive plate is electrically connected to the ground.

8. The electronic device of claim 6, wherein the conductive plate includes:
   a first conductive part having a first surface facing the substrate and on which the coil is disposed, and a second surface facing opposite to the first surface; and
   a second conductive part disposed on the first surface and physically separated from the coil.

9. The electronic device of claim 8, wherein the conductive plate further includes a conductive bonding material disposed between the second conductive part and the first surface.

10. The electronic device of claim 8, wherein the first conductive part and the second conductive part are integrally formed and has same conductive material.

11. The electronic device of claim 6, wherein the coil and the conductive plate have different conductive materials.

12. The electronic device of claim 1, further comprising:
    a flexible printed circuit board including the coil.

13. The electronic device of claim 12,
    wherein the flexible printed circuit board further includes at least one conductive pattern that is not disposed between the substrate and the coil and is physically separated from the coil; and
    wherein the at least one conductive pattern is electrically connected to the ground.

14. The electronic device of claim 1, further comprising:
    a printed circuit board that overlaps at least in part with the substrate,
    wherein the coil is disposed between the substrate and the printed circuit board, and
    wherein the touch sensing circuit is electrically connected to a touch controller integrated circuit (IC) disposed on the printed circuit board.

15. The electronic device of claim 1, further comprising:
    a foldable housing including:
       a first housing structure having a first surface and a second surface opposite to the first surface,
       a second housing structure having a third surface and a fourth surface opposite to the third surface, and a hinge structure connecting the first housing structure and the second housing structure, wherein the first surface and the third surface face each other when the first housing structure and the second housing structure are folded around the hinge structure;

a touch pad disposed within the first housing structure and forming a portion of the first surface; and a display disposed within the second housing structure and forming at least a portion of the third surface, wherein the touch pad includes the substrate including the touch sensing circuit.

* * * * *